United States Patent

[11] 3,575,211

[72] Inventor Joseph P. Wagner
       Knoxville, Tenn.
[21] Appl. No. 835,395
[22] Filed June 23, 1969
[45] Patented Apr. 20, 1971
[73] Assignee Robertshaw Control Company
       Richmond, Va.

[54] PNEUMATIC CONTROL SYSTEM AND RELAY VALVE CONSTRUCTION THEREFOR OR THE LIKE
8 Claims, 3 Drawing Figs.

[52] U.S. Cl. .................................................. 137/625.5, 251/31
[51] Int. Cl. .............................................. F16k 31/365
[50] Field of Search .......................................... 137/625.5, 102; 251/31

[56] References Cited
UNITED STATES PATENTS
251,897    1/1882   Kneeland ..................... 137/102
1,506,012  8/1924   Lewis ........................... 137/102X
3,134,395  5/1964   Glasgow ....................... 137/625.5X
3,155,365  11/1964  Hartung et al. ................ 251/31X Primary Examiner—M. Cary Nelson
Assistant Examiner—Michael O. Sturm
Attorney—Candor, Candor and Tassone ABSTRACT: A relay valve construction comprising a housing means having an inlet and a pair of outlets respectively interconnected to the inlet by a pair of valve seats controlled in an alternate manner by a valve member interconnected to a diaphragm means which is normally biased to one position thereof by a spring means and is adapted to be moved to another position thereof by a first pilot valve means directing a pilot pressure signal against one side of the diaphragm means, a second pilot valve means being provided for directing a canceling pilot pressure signal against the other side of the diaphragm means to move the same back to its one position in opposition to the force of the first-named pilot signal to thereby cancel the effect thereof.

INVENTOR.
JOSEPH P. WAGNER

BY
Candor, Candor & Tassone
HIS ATTORNEYS

PNEUMATIC CONTROL SYSTEM AND RELAY VALVE CONSTRUCTION THEREFOR OR THE LIKE

This invention relates to an improved pneumatic control system as well as to an improved relay valve construction for such a control system or the like.

It is well known that various pneumatic control systems have been provided for engine control purposes and the like wherein many separate valve parts are provided to function in a desired manner.

One of the features of this invention is to provide a relay valve construction which is adapted to transfer the flow from a main pressure source to two different pneumatically operated devices in an alternate manner by the use of a single valve member of the relay valve construction.

Another feature of this invention is to provide such a transfer from one main valve seat of the relay valve construction to the other thereof with a snap action so that no modulation is provided by the relay valve construction.

Another feature of this invention is to provide such transfer means by utilizing pilot valve means in the relay valve construction.

In particular, one embodiment of this invention provides a relay valve construction having a housing means provided with an inlet and a pair of outlets respectively interconnected to the inlet by a pair of valve seats, a movable valve member being provided for opening and closing the valve seats in an alternate manner. A diaphragm means is carried by the housing means and is operatively interconnected to the valve member to control movement thereof, the diaphragm means cooperating with the housing means to define a chamber therewith on one side of the diaphragm means. A spring means is carried by the housing means and normally tends to move the diaphragm means to one position thereof to cause the valve member to close one of the valve seats and open the other valve seat so that the inlet is only and normally interconnected to the outlet associated with the other valve seat. A pilot valve means is carried by the housing means and is adapted when in one position thereof to interconnect the chamber with the atmosphere and when in another position thereof to interconnect a pilot pressure signal to the chamber to act on the diaphragm means to move the same in opposition to the spring means and cause the valve member to close the other valve seat and open the one valve seat so that the inlet is now only interconnected to the normally closed outlet associated with the one valve seat. Another pilot valve means is carried by the housing means and is adapted when in one position thereof to interconnect another chamber on the other side of the diaphragm means with the atmosphere and when in another position thereof to interconnect a canceling pressure signal to the other chamber to act on the diaphragm means and cause the same to move in opposition to the pressure signal in the first-named chamber back to its one position so that the valve member again closes the one valve seat and opens the other valve seat whereby the inlet is again only interconnected to the normally open outlet associated with the other valve seat.

Accordingly, it is an object of this invention to provide an improved control system having one or more of the novel features of this invention as set forth above or hereinafter shown or described.

Another object of this invention is to provide an improved relay valve construction having one or more of the novel features set forth above or hereinafter shown or described.

Other objects, uses and advantages of this invention are apparent from a reading of this description which proceeds with reference to the accompanying drawings forming a part thereof and wherein.

Figure 1:
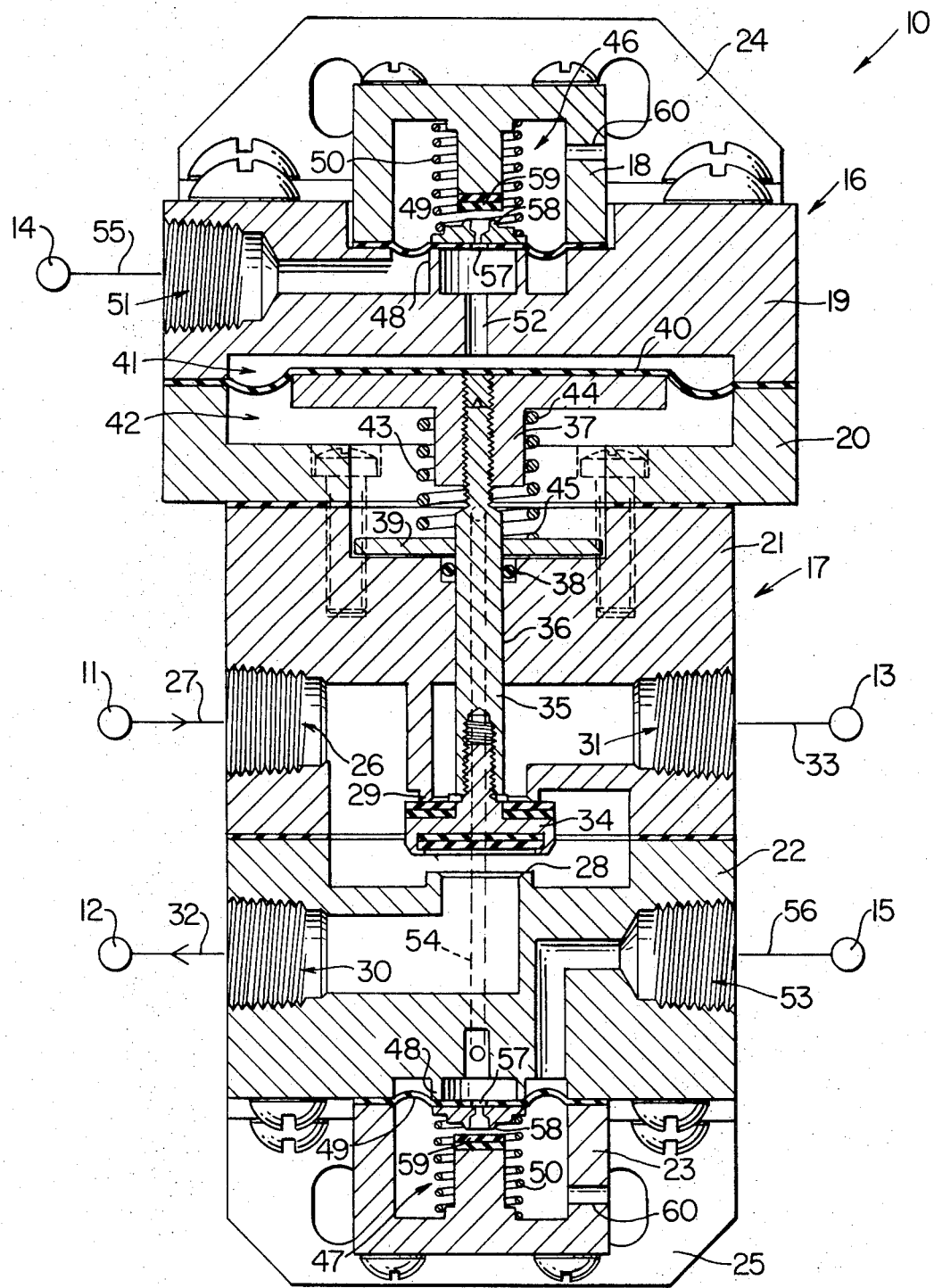
FIG. 1 is a cross-sectional view of the relay valve construction of this invention with the relay valve construction illustrated in one of its operating positions and being utilized in the control system of this invention which is schematically illustrated.

While the various features of this invention are hereinafter described and illustrated as being particularly adapted to provide the relay valve construction for a particular pneumatic control system of this invention, it is to be understood that the various features of this invention can be utilized singly or in any combination thereof to provide relay valve means for other systems as desired.

Therefore, this invention is not to be limited to only the embodiment illustrated in the drawings, because the drawings are merely utilized to illustrate one of the wide variety of uses of this invention.

Referring now to FIG. 1, the improved control system of this invention is generally indicated by the reference numeral 10 and comprises a main pneumatic pressure source 11, a pair of pneumatically operated devices 12 and 13, a pneumatic pilot pressure signal source 14, a canceling pneumatic pilot pressure signal source 15, and a relay valve construction 16 of this invention operatively interconnected to the means 11—15 in a manner hereinafter described to provide means for transferring the pneumatic source 11 in an alternate manner to the pneumatically operated devices 12 and 13 in a simple and effective manner without modulation of the flow of pressure fluid between the devices 12 and 13 as will be apparent hereinafter.

The relay valve construction 16 comprises a housing means 17 formed from a plurality of housing parts 18, 19, 20, 21, 22 and 23 suitably fastened and sealed together in the stacked relation illustrated in FIG. 1 and carrying bracket means 24 and 25 at the opposed ends thereof for effectively mounting the relay valve construction 16 to any desired supporting structure.

The housing parts 18—23 of the housing means 17 are formed in any suitable manner to cooperate together and define an inlet means 26 adapted to be interconnected to a conduit means 27 leading from the main pressure source 11, the inlet means 26 also being adapted to be interconnected by a pair of axially aligned and axially spaced valve seats 28 and 29 to outlet means 30 and 31 formed in the housing means 17 and being respectively interconnected to the pneumatically operated devices 12 and 13 by suitable conduit means 32 and 33.

Figure 2:
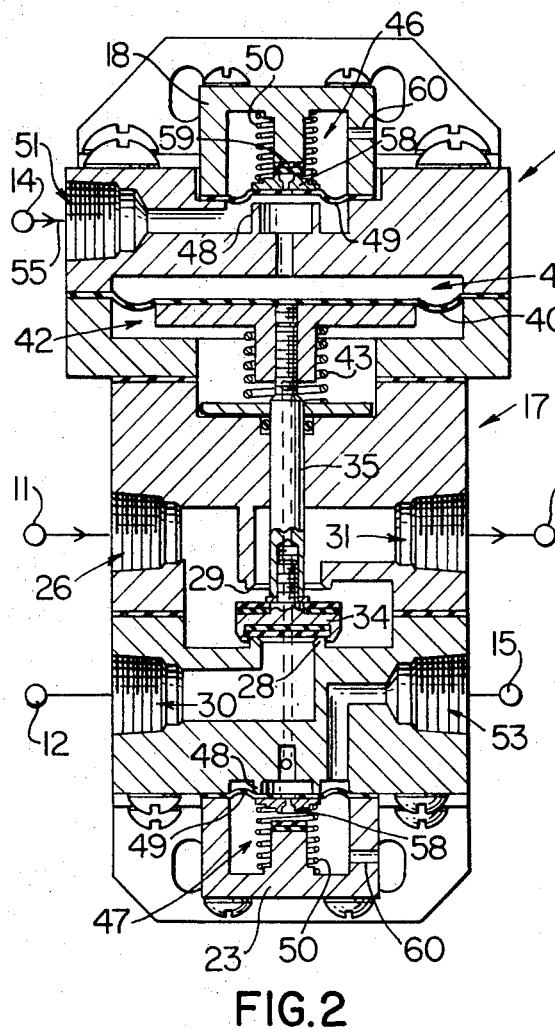
FIG. 2 is a view similar to FIG. 1, except in reduced form, and illustrates the relay valve construction in another operating position thereof.

However, a poppet valve member 34 is disposed in the housing means 17 between the valve seats 28 and 29 to control the same in an alternate manner so that when the valve member 34 closes against the upper valve seat 29, as illustrated in FIG. 1, the inlet means 26 is only interconnected to the outlet means 30. When the valve member 34 is moved against the valve seat 28 as illustrated in FIG. 2, the inlet 26 is only interconnected to the outlet 31.

The valve member 34 is interconnected to a valve stem means 35 which is axially movable in an opening 36 passing through the housing part 21 and is interconnected to a diaphragm backup member or shoe 37, the opening 36 being sealed by an O-ring 38 and washerlike member 39 telescopically disposed about the valve stem 35. A main flexible diaphragm 40 cooperates with the housing parts 19 and 20 to define chambers 41 and 42 on opposite sides of the diaphragm 40 with such chambers 41 and 42 being sealed from each other by the diaphragm member 40. The diaphragm 40 can be interconnected to the diaphragm backup plate or shoe 37 in any suitable manner so that the valve stem 35 and, thus, the valve member 34 will follow movement of the diaphragm 40 as will be apparent hereinafter.

A compression spring 43 is disposed in the chamber 42 and has one end 44 bearing against the diaphragm backup member or shoe 37 while the other end 45 thereof bears against the washer 39 so that the force of the compression spring 43 always tends to maintain the diaphragm member 40 in the up position as illustrated in FIG. 1 to thereby hold the valve member 34 in seating engagement against the valve seat 29 so as to prevent fluid communication between the inlet 26 and outlet 31 while normally permitting fluid communication between the inlet 26 and the outlet 30.

Two pilot valve means, generally indicated by the reference numerals 46 and 47, are respectively carried by the housing means 17 at the opposed ends thereof. The pilot valve means 46 and 47 comprising stationary valve seats 48 respectively leading to the chambers 41 and 42 in a manner hereinafter described and flexible diaphragms 49 carried by the housing means 17 and normally being urged to their closed positions against their respective valve seats 48 by compression springs 50 whereby when the diaphragm 49 of the pilot valve means 46 is in its closed position against its respective valve seat 48, a pilot pressure signal inlet means 51 formed in the housing part 19 is prevented from communicating with the chamber 41 through the valve seat 48 and interconnecting passage means 52. Similarly, the diaphragm 49 of the pilot valve means 47 is disposed in its closed position against its respective valve seat 48, a pilot pressure signal inlet means 53 formed in the housing part 22 is prevented from communicating with the chamber 42 through the valve seat 48 and its interconnecting passage means 54 formed through the housing parts 22 and 21 as illustrated in FIG. 1.

The pilot signal inlet means 51 is interconnected to the pilot pressure signal source 14 by suitable conduit means 55 while the pilot signal inlet means 53 is interconnected to the canceling pilot pressure signal system 15 by suitable conduit means 56.

Each diaphragm 49 of the pilot valve means 46 and 47 has an opening 57 passing therethrough in aligned relation with its respective valve seat 48 and in aligned relation with a movable valve seat 58 that moves in unison with the respective diaphragm 49. The housing parts 18 and 23 respectively carry stationary valve members 59 disposed spaced from their respective movable valve seats 58 so as to permit fluid communication between atmosphere or vent ports 60 thereof, through the respective open valve seats 58, and the respective chambers 41 and 42 when the diaphragms 49 are in their closed positions against their respective valve seats 48.

In this manner, as long as the diaphragms 49 are closing the respective valve seats 48, as illustrated in FIG. 1, the chambers 41 and 42 of the housing means 17 are at atmospheric condition so that the compression spring 43 maintains the flexible diaphragm 40 in its up position to maintain the valve member 34 closed against the valve seat 29 whereby the outlet means 30 is normally open and the outlet means 31 is normally closed.

From the above description, it can be seen that the pneumatic control system 10 and pneumatic relay valve construction 16 of this invention can be formed of relatively few parts in a simple and economical manner to be operated in a manner now to be described.

With the signal sources 14 and 15 being in the off condition as illustrated in FIG. 1 and with the main pneumatic source 11 being in the on condition as illustrated in FIG. 1, it can be seen that the compression spring 43 maintains the diaphragm 40 in its up position so that the valve member 34 is closing the valve seat 29 while maintaining the valve seat 28 in an open condition whereby the pneumatic source 11 is only and normally interconnected by the relay valve construction 16 of this invention to the pneumatically operated device 12 through the opened valve seat 28.

However, when the operator or suitable automatic means causes the pneumatic signal source 14 to be directed through the conduit means 55 to the relay construction 16 as illustrated in FIG. 2, the force of the pneumatic fluid being directed through the inlet means 51 against the under side of the diaphragm 49 of the pilot valve means 46 builds up in the inlet means 51 under the diaphragm 49 outside of the periphery of the valve seat 48 until the opposing load exerted by the compression spring 50 is overcome. At this time, the diaphragm 49 moves slightly away from the valve seat 48 and the signal pressure is applied to the full area of the under side of the diaphragm 49 so that the same will snap to its uppermost position with the valve seat 58 thereof closed against the stationary valve member 59 as illustrated in FIG. 2 so as to prevent loss of signal pressure out through the valve seat 58 and its associated atmosphere port 60.

The pneumatic signal fluid in the inlet means 51 is now free to flow through the opened valve seat 48 of the pilot valve means 46 in the manner illustrated in FIG. 2 and into the chamber 41 to act against the upper side of the diaphragm 40 in opposition to the force of the compression spring 43. With the chamber 41 now being almost immediately pressurized upon the snap opening of the valve seat 48 of the pilot valve means 46, the resulting pressure differential now acting across the diaphragm 40 causes the diaphragm 40 and, thus, the valve stem means 35 and valve member 34 to move downwardly from the position of FIG. 1 to the position of FIG. 2 with substantially a snap action to close the valve seat 28 and open the valve seat 29 whereby the pneumatic pressure source 11 is disconnected from the pneumatically operated device 12 and is only interconnected to the pneumatically operated device 13 through the normally closed, but now opened valve seat 29. This snap movement of the main valve member 34 prevents any modulated flow of pressure fluid to the device 13.

Thus, the relay valve construction 16 remains in the position illustrated in FIG. 2 as long as the pneumatic signal source 14 is being directed to the inlet means 51 of the relay valve construction 16. However, if it is desired to switch the pneumatic pressure source 11 back to the pneumatically operated device 12 while the pneumatic signal source 14 is still being interconnected to the inlet means 51 of the housing means 16, the canceling pneumatic signal source 15 is either interconnected manually or automatically to the inlet means 53 in the manner illustrated in FIG. 3 whereby the buildup of signal pressure in the inlet means 53 is applied against the upper side of the diaphragm 49 of the pilot valve means 47 outside the periphery of the valve seat 48 thereof to overcome the force of the compression spring 50 and snap the diaphragm 49 downwardly as illustrated in FIG. 3, in the same manner previously described for the pilot valve means 46, to close the valve seat 58 and open the valve seat 48 so that pressure fluid is now applied through the passage means 54 to the chamber 42.

Figure 3:
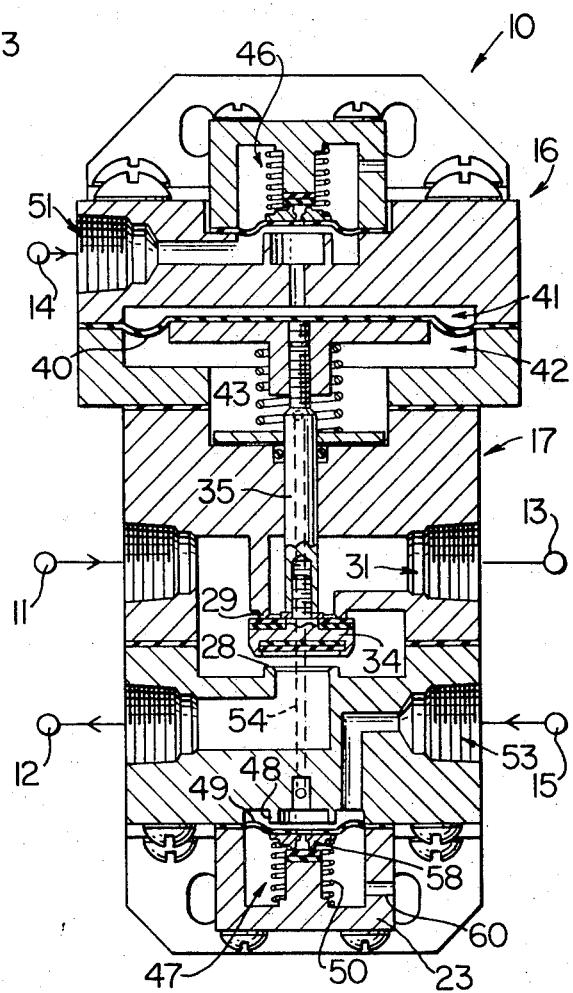
FIG. 3 is a view similar to FIG. 2 and illustrates the relay valve construction in another operating position thereof.

The pressure fluid now being directed into the chamber 42 of the relay valve construction 16 cancels the effect of the existing pressure on the top side of the diaphragm 40 whereby the compression spring 43 forces the diaphragm 40 and, thus, the valve stem 35 and valve member 34 upwardly with substantially a snap action to again seat the valve member 34 against the valve seat 29 in the manner illustrated in FIG. 3 so that the main pressure source 11 is disconnected from the pneumatically operated device 13 and is transferred back to the pneumatically operated device 12 without any modulated flow of pressure fluid to the device 12 whereby the relay construction 16 will remain in the condition illustrated in FIG. 3 as long as the pneumatic signal sources 14 and 15 are being respectively directed to the inlet means 51 and 53 of the housing means 17.

With the relay valve construction 16 now disposed in the condition illustrated in FIG. 3, a subsequent disconnection of the canceling pressure source 15 from the inlet means 53 causes the compression spring 50 of the pilot valve means 47 to return the diaphragm 49 against the valve seat 48 so that the movable valve member 58 thereof is now opened to vent the pressure in chamber 42 to the atmosphere through the vent port 60 of the housing part 23 whereby the pressure fluid in chamber 41 again forces the valve member 34 downwardly against the valve seat 28 to switch the pressure source 11 from the pneumatically operated device 12 back to the pneumatically operated device 13 as illustrated in FIG. 2.

With the relay valve construction 16 now disposed in the position illustrated in FIG. 2, a subsequent disconnection of the pneumatic signal source 14 from the inlet means 51 will cause the compression spring 50 of the pilot valve means 46 to move the diaphragm 49 thereof downwardly to close the valve seat 48 and open the valve seat 58 as illustrated in FIG. 1 so that the chamber 41 is now vented to the atmosphere through the vent port 60 of the housing part 18 whereby the compression spring 43 will move the diaphragm 40 and, thus, the valve stem means 35 and valve member 34 upwardly to close the valve seat 29 and open the valve seat 28 to thereby switch the pneumatic pressure source 11 from the pneumatically operated device 13 back to the pneumatically operated device 12 as illustrated in FIG. 1.

Therefore, it can be seen that in the control system 10 of this invention, the relay valve construction 16, when supplied only with the pneumatic source 11, will direct such source fluid out through the normally opened outlet means 30 to the device 12. With pilot inlet means 51 being pressurized, the relay valve construction 16 transfers with a snap action so that the source fluid is now directed out of the normally closed outlet means 31 to the device 13. The effect of subsequently supplying pressure fluid to the inlet means 53 of the relay valve construction 16 cancels the effect of the signal pressure at the inlet means 51 thereof and thereby returns the valve member 34 to its normal position with a snap action so that the source fluid flows out of the normally opened outlet means 30.

Accordingly, it can be seen that this invention not only provides an improved pneumatic control system, but also this invention provides an improved pneumatic relay valve construction for such a control system of the like.

I claim:

1. A relay valve construction comprising a housing means having an inlet and a pair of outlets respectively interconnected to said inlet by a pair of valve seats, a movable valve member for opening and closing said valve seats in an alternate manner, a diaphragm means carried by said housing means and being operatively interconnected to said valve member, said diaphragm means cooperating with said housing means to define a chamber therewith on one side of said diaphragm means, spring means carried by said housing means and normally tending to move said diaphragm means to one position thereof to cause said valve member to close one of said valve seats and open the other valve seat so that said inlet is only interconnected to the outlet associated with said other valve seat, and pilot valve means carried by said housing means and being adapted when in one position thereof to interconnect said chamber with the atmosphere and when in another position thereof to interconnect a pilot pressure signal to said chamber to act on said diaphragm means to move in opposition to said spring means and cause said valve member to close said other valve seat and open said one valve seat so that said inlet is only interconnected to the outlet associated with said one valve seat, said pilot valve means comprising a flexible diaphragm carried by said housing means, said pilot valve means further comprising a valve seat means carried by said housing means and being adapted to interconnect said pilot signal to said chamber, said pilot valve diaphragm when engaging said valve seat means preventing fluid communication between said pilot signal and said chamber, said pilot valve diaphragm having an opening therethrough aligned with said valve seat means, said opening being adapted to interconnect the atmosphere to said chamber through said valve seat means when said pilot diaphragm seats against said valve seat means.

2. A relay valve construction as set forth in claim 1 wherein said opening through said pilot valve diaphragm defines a movable valve seat that is in an open condition when said pilot diaphragm seats against said valve seat means, said housing means having a stationary valve member which is engaged by said movable valve seat when said pilot valve diaphragm moves away from said valve seat means to interconnect said pilot signal to said chamber whereby said stationary valve member closes said movable valve seat to prevent fluid communication between said chamber and the atmosphere.

3. A relay valve construction comprising a housing means having an inlet and a pair of outlets respectively interconnected to said inlet by a pair of valve seats, a movable valve member for opening and closing said valve seats in an alternate manner, a diaphragm means carried by said housing means and being operatively interconnected to said valve member, said diaphragm means cooperating with said housing means to define a chamber therewith on one side of said diaphragm means, spring means carried by said housing means and normally tending to move said diaphragm means to one position thereof to cause said valve member to close one of said valve seats and open the other valve seat so that said inlet is only interconnected to the outlet associated with said other valve seat, pilot valve means carried by said housing means and being adapted when in one position thereof to interconnect said chamber with the atmosphere and when in another position thereof to interconnect a pilot pressure signal to said chamber to act on said diaphragm means to move in opposition to said spring means and cause said valve member to close said other valve seat and open said one valve seat so that said inlet is only interconnected to the outlet associated with said one valve seat, the other side of said diaphragm means cooperating with said housing means to define another chamber therewith, and another pilot valve means being carried by said housing means and being adapted when in one position thereof to interconnect said other chamber with the atmosphere and when in another position thereof to interconnect a canceling pressure signal to said other chamber to act on said diaphragm means and cause the same to move in opposition to the pressure signal in said first-named chamber back to its said one position so that said valve member again closes said one valve seat and opens said other valve seat whereby said inlet is again only interconnected to the outlet associated with said other valve seat, each said pilot valve means comprising a flexible diaphragm carried by said housing means, each said pilot valve means further comprising a valve seat means carried by said housing means and being adapted to interconnect its respective signal to its respective chamber, each said pilot valve diaphragm when engaging its respective valve seat means preventing fluid communication between its respective signal and its respective chamber, each said pilot valve diaphragm having an opening therethrough aligned with its respective valve seat means, each said opening being adapted to interconnect the atmosphere to its respective chamber through its respective valve seat means when its respective pilot diaphragm seats against its respective valve seat means.

4. A relay valve construction as set forth in claim 3 wherein each said opening through its respective pilot valve diaphragm defines a movable valve seat that is in an open condition when its respective pilot diaphragm seats against its respective valve seat means, said housing means having a pair of stationary valve members which are respectively engaged by said movable valve seats when said pilot valve diaphragms move away from their respective valve seat means to interconnect their respective signals to their respective chambers whereby said stationary valve members respectively close said movable valve seats to prevent fluid communication between said chambers and the atmosphere.

5. A control system comprising a pair of pneumatically operated devices, a main pneumatic source, a pilot pressure signal source, a housing means having an inlet and a pair of outlets respectively interconnected to said inlet by a pair of valve seats, means interconnecting said inlet with said main pressure source and interconnecting said pneumatically operated devices respectively with said outlets, a movable valve member for opening and closing said valve seats in an alternate manner, a diaphragm means carried by said housing means and being operatively interconnected to said valve member, said diaphragm means cooperating with said housing means to define a chamber therewith on one side of said diaphragm means, spring means carried by said housing means and normally tending to move said diaphragm means to one position thereof to cause said valve member to close one of said valve seats and open the other valve seat so that said inlet is only interconnected to the outlet associated with said other valve seat, and pilot valve means carried by said housing means and being adapted when in one position thereof to interconnect said chamber with the atmosphere and when in another position thereof to interconnect said pilot pressure signal source to said chamber to act on said diaphragm means to move in opposition to said spring means and cause said valve member to close said other valve seat and open said one valve seat so that said inlet is only interconnected to the outlet associated with said one valve seat, said pilot valve means comprising a flexible diaphragm carried by said housing means, said pilot valve means further comprising a valve seat means carried by said housing means and being adapted to interconnect said pilot signal source to said chamber, said pilot valve diaphragm when engaging said valve seat means preventing fluid communication between said pilot signal source and said chamber, said pilot valve diaphragm having an opening therethrough aligned with said valve seat means, said opening being adapted to interconnect the atmosphere to said chamber through said valve seat means when said pilot diaphragm seats against said valve seat means.

6. A control system as set forth in claim 5 wherein said opening through said pilot valve diaphragm defines a movable valve seat that is in an open condition when said pilot diaphragm seats against said valve seat means, said housing means having a stationary valve member which is engaged by said movable valve seat when said pilot valve diaphragm moves away from said valve seat means to interconnect said pilot signal source to said chamber whereby said stationary valve member closes said movable valve seat to prevent fluid communication between said chamber and the atmosphere.

7. A control system comprising a pair of pneumatically operated devices, a main pneumatic source, a pilot pressure signal source, a housing means having an inlet and a pair of outlets respectively interconnected to said inlet by a pair of valve seats, means interconnecting said inlet with said main pressure source and interconnecting said pneumatically operated devices respectively with said outlets, a movable valve member for opening and closing said valve seats in an alternate manner, a diaphragm means carried by said housing means and being operatively interconnected to said valve member, said diaphragm means cooperating with said housing means to define a chamber therewith on one side of said diaphragm means, spring means carried by said housing means and normally tending to move said diaphragm means to one position thereof to cause said valve member to close one of said valve seats and open the other valve seat so that said inlet is only interconnected to the outlet associated with said other valve seat, pilot valve means carried by said housing means and being adapted when in one position thereof to interconnect said chamber with the atmosphere and when in another position thereof to interconnect said pilot pressure signal source to said chamber to act on said diaphragm means to move in opposition to said spring means and cause said valve member to close said other valve seat and open said one valve seat so that said inlet is only interconnected to the outlet associated with said one valve seat, the other side of said diaphragm means cooperating with said housing means to define another chamber therewith, a canceling pilot pressure signal source, and another pilot valve means being carried by said housing means and being adapted when in one position thereof to interconnect said other chamber with the atmosphere and when in another position thereof to interconnect said canceling pressure signal source to said other chamber to act on said diaphragm means and cause the same to move in opposition to the pressure signal in said first-named chamber back to its said one position so that said valve member again closes said one valve seat and opens said other valve seat whereby said inlet is again only interconnected to the outlet associated with said other valve seat, each said pilot valve means comprising a flexible diaphragm carried by said housing means, each said pilot valve means further comprising a valve seat means carried by said housing means and being adapted to interconnect its respective signal source to its respective chamber, each said pilot valve diaphragm when engaging its respective valve seat means preventing fluid communication between its respective signal source and its respective chamber, each said pilot valve diaphragm having an opening therethrough aligned with its respective valve seat means, each said opening being adapted to interconnect the atmosphere to its respective chamber through its respective valve seat means when its respective pilot diaphragm seats against its respective valve seat means.

8. A control system as set forth in claim 7 wherein each said opening through its respective pilot valve diaphragm defines a movable valve seat that is in an open condition when its respective pilot diaphragm seats against its respective valve seat means, said housing means having a pair of stationary valve members which are respectively engaged by said movable valve seats when said pilot valve diaphragms move away from their respective valve seat means to interconnect their respective signal sources to their respective chambers whereby said stationary valve members respectively close said movable valve seats to prevent fluid communication between said chambers and the atmosphere.